United States Patent [19]

Heiser et al.

[11] 4,306,002
[45] Dec. 15, 1981

[54] MULTIPLE CELL VENT CAP FOR A STORAGE BATTERY

[75] Inventors: Joseph I. Heiser, Wyomissing Hills; Terry R. Oxenreider, Wernersville, both of Pa.

[73] Assignee: General Battery Corp., Reading, Pa.

[21] Appl. No.: 146,066

[22] Filed: May 2, 1980

[51] Int. Cl.$^3$ .............................. H01M 2/12
[52] U.S. Cl. ........................... 429/84; 429/87; 429/88; 429/89
[58] Field of Search .............. 429/82, 88, 87, 89, 429/84, 72

[56] References Cited

U.S. PATENT DOCUMENTS

| | | | |
|---|---|---|---|
| 3,265,538 | 8/1966 | Lucas | 429/88 |
| 3,879,227 | 4/1975 | Hennen | 429/88 X |
| 4,086,395 | 4/1978 | Heiser et al. | 429/88 |
| 4,098,963 | 8/1978 | Moca | 429/88 |
| 4,168,350 | 9/1979 | Oxenreider et al. | 429/87 |
| 4,186,247 | 1/1980 | Mocas | 429/88 |
| 4,203,791 | 5/1980 | Heiser et al. | 156/252 |

Primary Examiner—Anthony Skapars
Attorney, Agent, or Firm—Benasutti Associates, Ltd.

[57] ABSTRACT

A vent cap for a storage battery, which vent cap includes a base portion and a cover portion which are retained to each other to provide a gas collecting enclosure. The base portion comprises a tray and peripherally extending walls, and is divided into a plurality of cavities by at least one transversely extending rib, which cavities include a first segment having an assembly which communicates with one of the cells of the battery and a second segment which is substantially enclosed to form a holding area and which is separated from the first segment by a plurality of baffles having an aperture which permits limited communication between the first and second segments. The cover portion comprises a substantially planar surface, having a plurality of cup shaped members depending therefrom and which cooperate with the assembly which communicates with the battery cell, and a plurality of slots positioned along an edge of the cover portion opposite the cup shaped members and capable of venting a gas from the second segment to the atmosphere.

21 Claims, 5 Drawing Figures

MULTIPLE CELL VENT CAP FOR A STORAGE BATTERY

BACKGROUND OF THE INVENTION

The present invention relates generally to the field of vented battery caps, and more particularly to a multiple plug vented battery cap which reduces the loss of battery electrolyte during battery use and/or minimizes the expulsion of gases from the battery into the atmosphere.

It is well known that a suitable battery vent plug must provide for the expulsion of gases which build up during the chemical reactions which take place during the charging and discharging of a battery, while effectively preventing the leakage or evaporation of substantial quantities of the battery electrolyte. To this end, battery vent plugs are normally designed with gaseous evacuation means for venting the gases produced within the battery to the atmosphere, while providing electrolyte retention means within the battery vent plug for retaining and returning to the battery as much of the electrolyte as is practically feasible. This retention of battery electrolyte is normally accomplished through the use of various baffles and/or gabled floors in the battery vent cap which tend to funnel the battery electrolyte which escapes into the battery vent plug back into the cells of the battery.

In the interest of safety, it is also desirable that the battery vent plug be designed to minimize the chance that a spark occuring in the vicinity of the battery could ignite escaping battery gases, thereby resulting in a possible explosion of the battery vent cap away from the battery container, or even the explosion of the battery itself.

Conventional maintenance requiring batteries are generally provided with a plurality of removable vent caps, through which fluid may be added to the cells as required, each of which is configured to satisfy one or more of the above requirements. Moreover, in recent battery designs, it has become common to mate a plurality of cell vent caps, generally three, into a single "gang" type vent, to provide additional area over the cells of the battery for gathering the vapors that are produced as the battery is charged or discharged, and to condense them for re-entry into the battery. This serves to reduce the amount of maintenance required on the battery to maintain the required fluid level in each cell.

Recent technology has produced what is sometimes referred to as the maintenance free battery, having essentially sealed tops which do not permit the addition of fluid to the individual cells. The maintenance free battery uses a very large condensing area above the plurality of cells, and a battery case having vent frits which are spaced apart from the cells opposite the respective positive and negative terminal posts to permit the escape of explosive gases to the atmosphere, thus preventing battery explosions.

It is the purpose of the present invention to provide a conventional maintenance requiring battery with a venting cap structure which is specifically adapted to substantially reduce battery maintenance, yet which is fully compatable with conventional maintenance requiring batteries, permitting convenient access to the cells of the battery should servicing of the battery ever become necessary.

SUMMARY OF THE INVENTION

In accordance with the present invention, there is provided a box type battery vent cap having a base portion and a cover portion. The base portion is substantially rectangular and is divided into a series of cavities, one for each of the battery cells to be enclosed by the vent cap. Each cavity is subdivided into at least two segments; a first segment having means for communicating with the corresponding cell of the battery and for enclosing that cell during battery operation; and a second segment, which serves as a holding area, separated from the first segment by a series of baffles. The cover portion has a shape which is adapted to substantially overfit and enclose the base portion, and is provided with a series of depending cup shaped members which depend downwardly into that portion of the first segment of the base portion which communicates with the cell of the battery. The cover is additionally provided with a series of slots, or indentations, peripherally spaced along one of the edges of the cover at positions horizontally opposing the cup shaped members. The cover portion and base portion are further provided with a series of pegs and bosses, respectively, which cooperate to retain those components together upon assembly.

The battery vent cap of the present invention is configured to provide a much larger internal area than do existing vent cap assemblies, as well as to provide a lower profile than such assemblies. Such a configuration combines with the structure comprising the vent cap to increase the amount of escaping gases which are condensed and eventually returned to the cells of the battery, thereby substantially reducing the maintenance required to assure continued operation of the battery.

The vent cap of the present invention is adapted for convenient placement over the openings to the cells of a battery, as are conventional vent cap assemblies. In this manner, conventional maintenance requiring batteries are made to be substantially maintenance free, without requiring the use of a clumsy unworkable structure which would otherwise interfere with normal battery usage.

It is accordingly an object of the present invention to provide a box type vent cap which is adapted for use with a conventional maintenance requiring battery and which renders the battery substantially maintenance free during operation.

It is another object of the present invention to provide a box type vent cap which is adapted for use with a conventional maintenance requiring battery and which is capable of maintaining the electrolyte level within the cells of the battery without requiring substantial servicing.

It is another object of the present invention to provide a box type vent cap which is adapted for use with a conventional maintenance requiring battery and which minimizes the expulsion of gases to the atmosphere while effectively preventing leakage or evaporation of the battery's electrolyte.

It is another object of the present invention to provide a box type vent cap for a storage battery which substantially reduces battery maintenance and which is fully compatible with existing maintenance requiring storage batteries, permitting convenient access to the cells of the storage battery should servicing ever be required.

These and other objects will become apparent from the following description of the preferred embodiment of the invention, taken in view of the following illustrations.

BRIEF DESCRIPTION OF THE DRAWINGS

In each of the several views provided, like reference numerals denote similar structure.

DESCRIPTION OF THE PREFERRED EMBODIMENT

Figure 1:
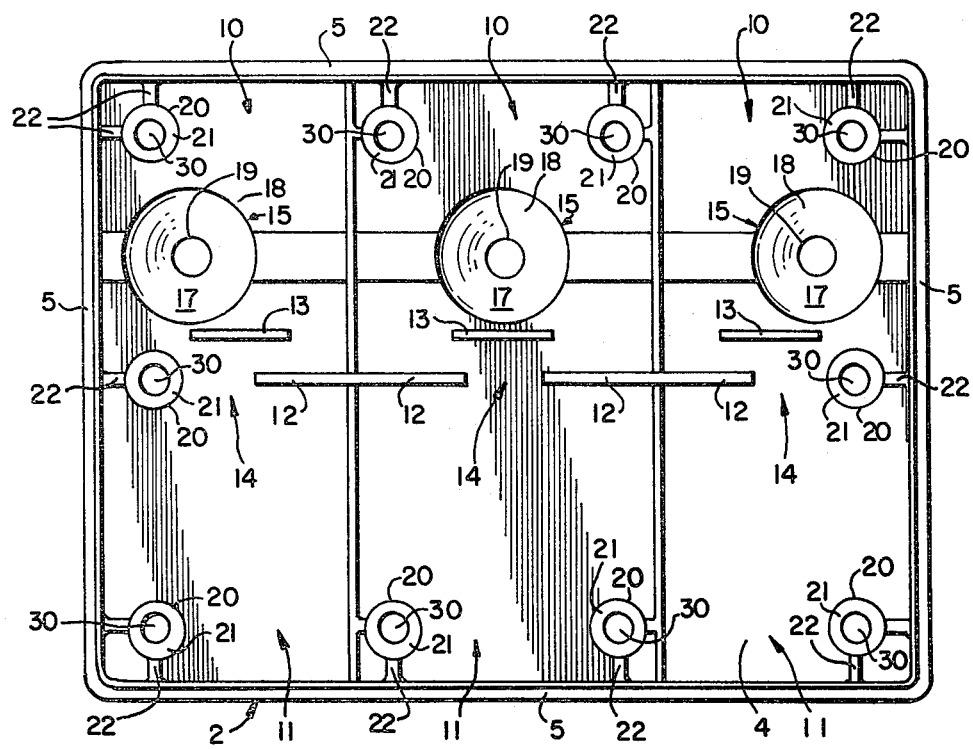
FIG. 1 is a top plan view of the base portion of the vent cap of the present invention.

Although specific forms of the invention have been selected for illustration in the drawings, and the following description is drawn in specific terms for the purpose of describing these forms of the invention, this description is not intended to limit the scope of the invention which is defined in the appended claims.

The battery vent cap 1 of the present invention generally comprises a base portion 2 and a cover portion 3 which are assemled to form an enclosure as will be more fully described below.

Figure 2:
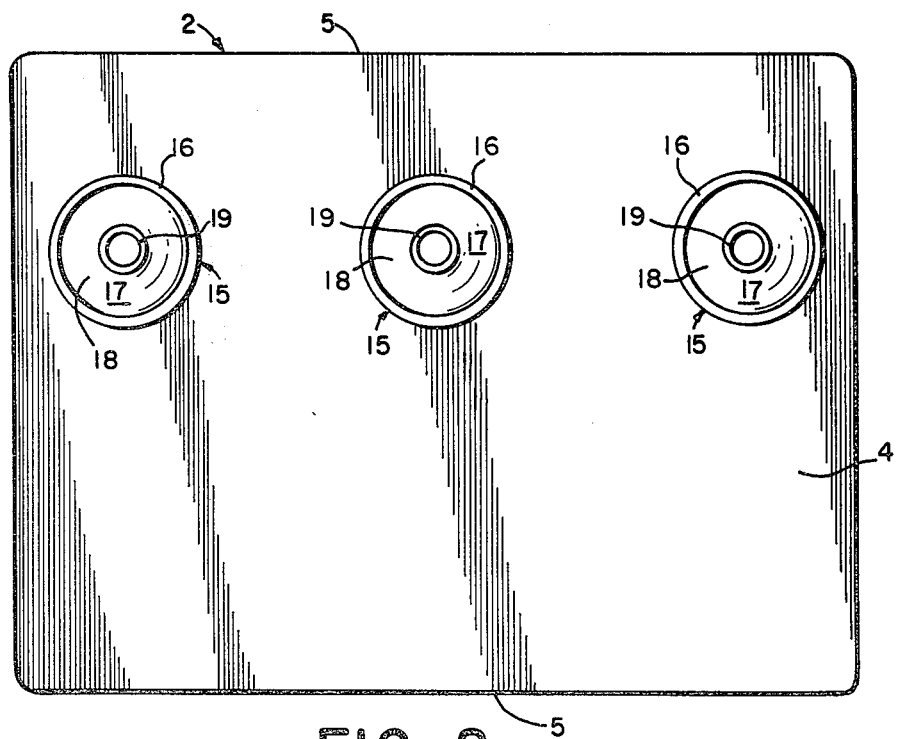
FIG. 2 is a bottom plan view of the base portion of the vent cap of the present invention.
Figure 4:
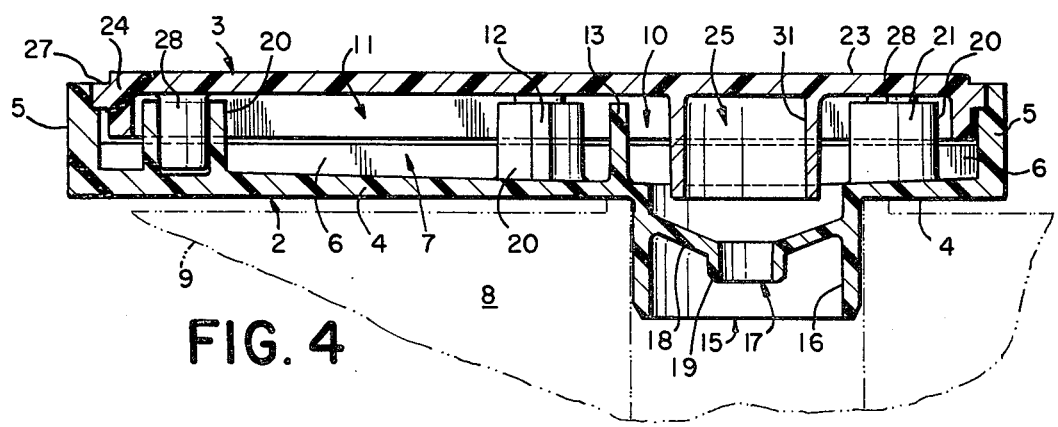
FIG. 4 is a cross sectional view of the vent cap of the present invention, positioned over the cell of a storage battery.

FIGS. 1, 2, and 4 illustrate a preferred embodiment of the base portion 2 of vent cap 1. Base portion 2 generally comprises a tray 4 having walls 5 peripherally extending about its perimeter. Tray 4 further comprises a plurality of transverse ribs 6 which subdivide tray 4 into a plurality of cavities 7.

The vent cap 1 illustrated includes three cavities 7, each of which is adapted to communicate with the cell 8 of a storage battery 9. Although the vent cap 1 illustrated includes three cavities 7, it is equally possible to construct a vent cap which includes other numbers of cavity 7. Since most conventional storage batteries include six cells, the vent cap 1 illustrated is preferred, so that two such vent caps may conveniently be used to completely enclose the cells of the storage battery.

Each cavity 7 comprises two segments: a first segment 10 adapted for communication with the cell 8 of a storage battery 9; and a second segment 11 which acts as a holding area, as will be more fully described below.

The first segment is provided with means for communicating with the cell 8 of the storage battery 9. As is best illustrated in FIG. 4, communication means 15 generally comprises a tubular member 16 depending downwardly from tray 4, and a baffle 17 annularly positioned within the tubular member 16. As illustrated, baffle 17 includes a sloping surface 18 which extends from the tubular member 16, downwardly into a flanged opening 19, permitting limited communication between the first segment 10 and the cell 8 of storage battery 9.

Second segment 11 generally comprises a substantially open area the base of which slopes downwardly from the end wall 5 of tray 4 toward the baffles 12, 13, as illustrated in FIG. 4.

First segment 10 and second segment 11 are separated from each other by a plurality of transversely extending baffles 12, 13. A first baffle 12 is positioned essentially centrally along the length of the rib 6 separating adjacent cavities 7, and is provided with an opening 14 which permits communication between first segment 10 and second segment 11. A second baffle 13 is positioned in substantial alignment with the opening 14 in baffle 12, so that it is substantially parallel to, and offset from, the opening 14. In this manner, only indirect communication is permitted between the first segment 10 and the second segment 11.

Vent cap 1 also includes a plurality of bosses 20 positioned about the perimeter of the tray 4. As illustrated, each boss 20 comprises a cylindrical sleeve 21, and supporting ribs 22 connected to the walls 5 and/or ribs 6 of the vent cap 1. The cylindrical sleeve 21 of each boss is adapted for engagement of the cover portion 3 of vent cap 1, as will be more fully described below.

Figure 3:
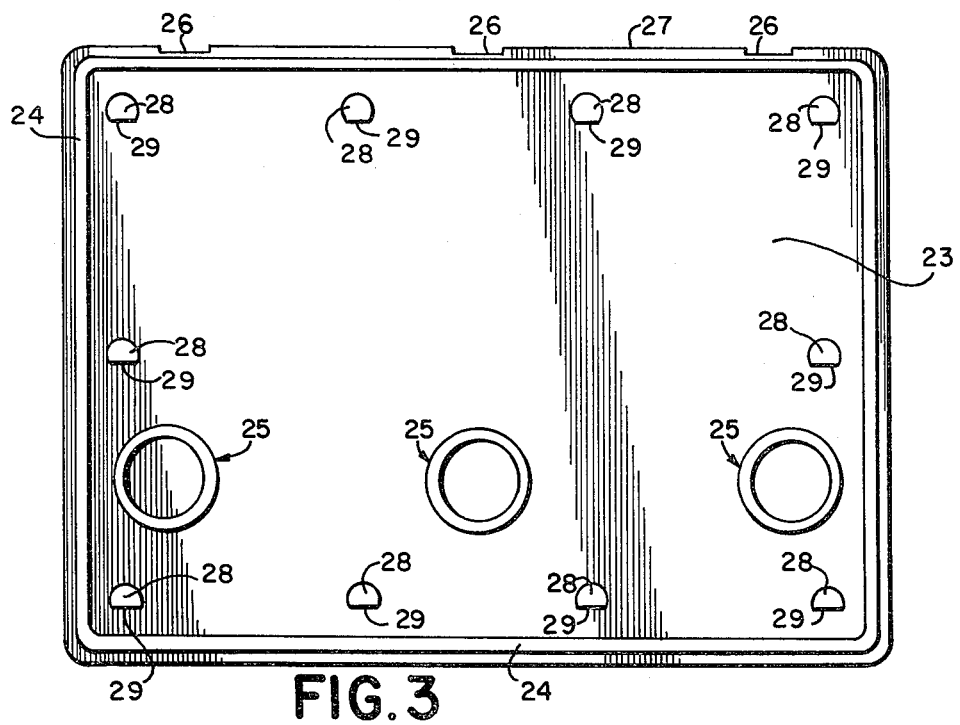
FIG. 3 is a bottom plan view of the cover portion of the vent cap of the present invention.

Referring now to FIGS. 3 and 4, a preferred embodiment of cover portion 3 is shown. Cover portion 3 generally comprises an essentially planar tray 23, a plurality of cup shaped members 25, and a plurality of slots 26. Planar tray 23 includes a sealing member 24 which peripherally extends around tray 23 and which is adapted to cooperate with the walls 5 of the base portion 2 to provide a secure closure between the base portion 2 and the cover portion 3.

Each of the cup shaped members 25 are essentially cylindrical in shape, extending downwardly from the tray 23. The lower most end of each member 25 is left open. As is best illustrated in FIG. 4, the cup shaped members 25 are positioned so that, upon assembly of the base portion 2 and cover portion 3, the cup shaped members 25 are concentric with the communication means 15 of the base portion 2, extending downwardly into the opening defined by the tubular members 16 comprising the communication means.

As previously described, cover portion 3 comprises a plurality of slots 26 provided along one of its longitudinal edges, shown at 27. One such slot is provided for each of the cavities 7 comprising the vent cap 1. Each slot 26 is adapted to permit gases which are collected within the cavity 7 of vent cap 1 to escape through the cover portion 3 to the atmosphere. As illustrated, slots 26 are preferably positioned along the longitudinal edge 27 of cover portion 3 which is furthest from the cup shaped members 25, and consequently the communication means 15. Moreover, each slot 26 is preferably positioned along the longitudinal edge 27 so that it lies substantially in alignment with its associated cup shaped member 25, and consequently, the communication means 15. In the preferred embodiment, the slots 26 are also positioned in transverse alignment with the baffle 13 of the base portion 2, and accordingly with the opening 14. As will be more fully described below, this positioning is important in optimizing the flow characteristics within the cavity 7, consequently restricting the amount of gases that escape from vent cap 1 and thereby increasing the amount of condensed gases returned to the cell 8 of the storage battery 9.

Additionally, the tray 23 of cover portion 3 includes a plurality of pegs 28 which assist in retaining the cover portion 3 to the base portion 2. Each peg 28 is essentially cylindrical in shape, also including a notch 29 as illustrated. Pegs 28 are positioned about the tray 23 so that they will be in substantial alignment with the bosses 20 of the base portion 2. The diameter of each of the pegs 28 essentially corresponds to that of the opening 30 defined by the interior of each of the sleeves 21, so that the base portion 2 and cover portion 3 may conveniently be connected to one another by positioning the pegs 28 over the bosses 20 and then frictionally engaging these elements to each other, forming the enclosure illustrated.

FIG. 4 illustrates the structure contained within the enclosure defined by the assembled base portion 2 and cover portion 3. As illustrated, each boss 20 is engaged by a peg 28, providing structural integrity to vent cap 1. Each cup shaped member 25 is vertically aligned with the communication means 15 of the first segment 10. Further, the second segment 11 defines an enclosure having a floor 18 which slopes toward the communication means 15. Additionally, the sealing means 24, as well as the peripheral edges of the tray 23, combines with the walls 5 of base portion 2 to form an enclosure which is substantially sealed from the atmosphere, with the exception of the openings provided by the slots 26.

In operation, the assembled vent cap 1 is positioned over the cells 8 of a storage battery 9, the communication means 15 of the vent cap 1 engaging the openings of the storage battery 9 which are used to introduce the electrolyte into the battery. For the vent cap 1 illustrated, the communication means 15 associated with each of the three cavities 7 comprising the vent cap 1 communicates with a different cell of the storage battery. Once in position, vent cap 1 is particularly well adapted to reduce the los of electrolyte from the cells of the battery, while also permitting gases resulting from the chemical reactions which take place during charging and discharging of the battery to escape into the vent cap 1 if necessary.

Electrolyte leakage is substantially eliminated by cooperation between the baffle 17 of the communication means 15 and the cup shaped member 25 of cover portion 3. The majority of any electrolyte which may be caused to splash upwardly from the cell 8 is prevented from passing through the communication means 15 by the sloping surface 18 and the flanged opening 19. Electrolyte impinging upon these surfaces would be immediately returned to the cell 8. Should any electrolyte pass through the center of the flanged opening 19 into the first segment 10 of the cavity 7, such escaping electrolyte would generally enter the cavity which is centrally located within the cup shaped member 25. Such electrolyte would then pass down the inner wall 31 of the cup shaped member 25, dropping onto the sloping surface 18, subsequently passing over the flanged opening 19 and back to the cell 8. Should any electrolyte pass beyond the cup shaped member 25 and into the cavity 7, such escaping electrolyte would subsequently be collected in the first segment 10 for return to the cell 8 along with any condensed, escaped gases which are being returned to the cell 8, as will be further described below.

Any gases produced as a result of the chemical processes associated with the charging and discharging cycles encountered during battery operation are permitted to escape from cell 8 through the flanged opening 19 of the communication means 15, and into the first segment 10 of the cavity 7. If necessary, gases may then escape from the first segment 10, through the opening 14 and between baffles 12, 13, into the second segment 11, lastly exiting at slots 26 into the atmosphere. Providing such an escape path for trapped gases serves to substantially eliminate the possibility of the battery 9 exploding as the result of excess gases being trapped either in the cell 8 or in the vent cap 1. However, as previously stated, it is preferred that the majority of any gases escaping from cell 8 be collected, condensed and returned to the cell 8, thereby reducing the amount of maintenance required to assure proper battery operation. This recovery operation is accomplished by providing the vent cap 1 with a series of flow restricting structures which assist in the condensation of escaped gases for return to the cell 8.

The first flow restricting structure encountered by escaping gases comprises the baffle 17 of the communication means 15 in combination with the annularly positioned cup shaped member 25. Gases escaping from a cell 8 tend to be collected within the cavity defined by the cup shaped member 25, subsequently condensing and returning to cell 8 through the flanged opening 19. Gases not recovered in this fashion are permitted to pass between the edges of the cup shaped member 25 and the sloping surface 18 of the baffle 17 into the first segment 10.

The second flow restricting structure encountered by escaping gases is the first segment 10 of the cavity 7. Due to the interaction between the baffles 12, 13, the ribs 6, the base portion 2 and the cover portion 3, the flow of gases out of the first segment 10 is restricted, again contributing to the condensation of such gases for return to the battery cell 8 through the communication means 15. Any gases not condensed and returned to cell 8 are then permitted to pass into the second segment 11 through the opening 14.

The third flow restricting structure encountered by escaping gases is the second segment 11 of cavity 7. Second segment 11 acts as a relatively large holding area, adapted to retain gases therein for subsequent condensation and return to the cell 8. Return of the condensed gases to the cell 8 is assisted by the configuration of the tray 4 of the base portion 2, which slopes downwardly from the outer most portions of the second segment 11 toward the opening 14 which communicates with the first segment 10. Once in the first segment 10, condensed gases may then be returned to the cell 8 through the communication means 15 as previously described. Any gases not condensed and recovered to this point may then be vented to the atmosphere through the slot 26 associated with the cavity 7.

Accordingly, it may be seen that the vent cap 1 of the present invention is particularly well adapted to optimize the gas flow and condensation between each of the cells 8 of a battery 9 and the atmosphere. Although it is generally preferred to separately maintain each of the cells 8 comprising the battery 9, at times it becomes desirable to permit additional gas flow between adjacent cavities 7 within the vent cap 1, should such gas flow be required to accommodate an unusual imbalance in the production of gases within a particular cell 8. The vent cap 1 of the present invention is configured to accommodate such a potential need. For example, as illustrated, the baffles 12 are configured so that they do not contact the lower side of the cover portion 3. In addition, a space is also maintained between the ribs 6 and the cover portion 3. These structural features provide gas flow passageways which ordinarily are not used, but which are capable of accommodating circumstances in which unusual gas production rates are encountered.

Figure 5:
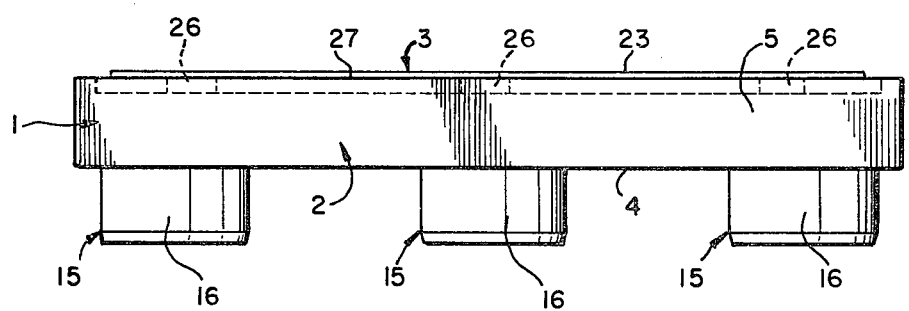
FIG. 5 is a side elevational view of the vent cap of the present invention.

As may be seen in FIGS. 4 and 5, vent cap 1 is dimensionally configured to have a maximum gas containing capacity while also retaining the lowest possible profile. This is to assure that vent cap 1 is readily adapted for use with a wide variety of battery types without presenting any unnecessary or clumsy structure which would otherwise interfere with other objects in proximity to the battery. To this end, vent cap 1 is provided with an interior cavity which is substantially larger than that of previous vent caps, to assist in the condensation of gases which are expelled from the cells 8, while also having a low profile to avoid interference with structure which may, for example, be positioned over the battery. Clearly, in order to accommodate a wide variety of storage battery types, the dimensions of the various elements comprising the vent cap 1 may be suitably varied to provide the structural relationships between the elements comprising the base portion 2 and cover portion 3 which have previously been described.

The configuration of the slots 26 may also be varied to optimize gas flow between the vent cap 1 and the atmosphere, as well as to reduce the possibility of igniting escaping gases. In the preferred embodiment, each slot 26 is rectangular in shape, having a width of approximately 0.003 inches and a depth of at least 0.040 inches and preferably greater than 0.060 inches. The shape or type of aperture used, as well as its dimensions, may all be suitably varied.

It will be understood that various changes in the details, material and arrangement of parts which have been herein described and illustrated in order to explain the nature of this invention may be made by those skilled in the art within the principle and scope of the invention as expressed in the following claims.

What is claimed is:

1. A vent cap for a storage battery having a plurality of cells, said vent cap comprising:
   a. a base portion comprising a tray and peripherally extending walls which define a cavity, said cavity further comprising:
      (i) a first segment having communication means for communicating between the cavity and the cell of the battery, said communication means having a hollow cylindrical member depending vertically downwardly from the tray of the base portion and a baffle means positioned annularly within the cylindrical member, said baffle means having a surface which slopes downwardly toward the center of the communication means and terminates in a downwardly depending flange, and
      (ii) a second segment which is substantially enclosed and separate from the first segment by second baffle means, said second baffle means having an aperture which permits communication between the first and second segments;
   b. a cover portion comprising a substantially planar surface, having a plurality of cup-shaped members depending therefrom, and having a plurality of apertures positioned along one of the edges of the cover members; and
   (c) means for retaining the cover portion to the base portion, thereby providing an enclosed vent cap assembly.

2. A vent cap for a storage battery having a plurality of cells, and vent cap comprising:
   a. a base portion comprising a tray and peripherally extending walls which define a cavity comprising:
      (i) a first segment having means for communicating between the cavity and the cell of the battery, and
      (ii) a second segment which is substantially enclosed and separated from the first segment by baffle means having an aperture which permits communications between the first and second segment, said baffle means further having a first baffle separating the first and second segments and located substantially along the central portions of the cavity, the first baffle including an aperture therein, and a second baffle positioned centrally parallel with and spaced from the first baffle and in substantial transverse alignment with the opening in the first baffle;
   b. a cover portion comprising a substantially planar surface, having a plurality of cup-shaped members depending therefrom, and having a plurality of apertures positioned along one of the edges of the cover portion; and
   c. means for retaining the cover portion to the base portion thereby providing an enclosed vent cap assembly.

3. The vent cap of claim 2 wherein the second baffle and the opening in the first baffle are in substantial transverse alignment with at least one of the apertures of the cover portion.

4. The vent cap of claim 3 wherein the second baffle and the opening in the first baffle are in substantial transverse alignment with the communication means of the base portion.

5. A vent cap for a storage battery having a plurality of cells, the vent cap comprising;
   a. a base having peripherally extending walls which defines a cavity comprising:
      (i) a first segment having means for communicating between said cavity and the cell of the battery,
      (ii) a second segment which is substantially enclosed and separated from the first segment by baffle means having an aperture which permits communication between the first and second segments, and
      (iii) a tray extending between said peripherally extending walls, where in those portions of the tray which are operatively associated with the second segment slope progressively downward toward the baffle means.
   b. a cover portion comprising a substantially planar surface, having a plurality of cup-shaped members depending therefrom, and having a plurality of apertures positioned along one of the edges of the cover member; and
   c. means for retaining the cover portion to the base portion, thereby providing an enclosed vent cap assembly.

6. The vent cap of claim 5 wherein said cavity comprises substantially equal first and second segments.

7. The vent cap of claim 5 wherein said vent cap comprises a plurality of cavities defined by rib means extending transversely to said baffle means and between opposing walls of the base portion.

8. The vent cap of claim 7 wherein said cavity comprises substantially equal first and second segments.

9. A vent cap for a storage battery having a plurality of cells, said vent cap comprising:
   a. a base portion comprising a tray and peripherally extending walls which define a cavity comprising:
      (i) a first segment having means for communicating between the cavity and the cell of the battery, and (ii) a second segment which is substantially enclosed and separated from the first segment by baffle means having an aperture which permits communication between the first and second segment;

b. a cover portion comprising a substantially planar surface, having a plurality of cup-shaped members depending therefrom and having a plurality of apertures positioned along one of the edges of the cover portion; and c. means for retaining the cover portion to the base portion, said means comprising a plurality of bosses connected to the base portion and a plurality of boss engaging pegs attached to the cover proportion, thereby providing an enclosed vent cap assembly.

10. The vent cap of claim 9 wherein the cup shaped member of the cover portion and the communication means of the base portion are positioned in substantially concentric, vertically spaced alignment.

11. The vent cap of claim 9 wherein the lowermost edge of the cup shaped member extends downwardly into the interior of the communication means.

12. The vent cap of claim 9 wherein the cup shaped member comprises a hollow cylindrical member depending downwardly from the cover portion.

13. The vent cap of claim 9 wherein the apertures of said cover portion are located along the longitudinal edge of the cover portion farthest from the cup shaped members.

14. The vent cap of claim 9 wherein the apertures of said cover portion are in substantial transverse alignment with the cup shaped members.

15. The vent cap of claim 9 wherein the cup shaped members of the cover portion and the communication means of the base portion are positioned in substantially concentric, vertically spaced alignment, and wherein the apertures of said cover portion are in substantial transverse alignment with the communication means.

16. The vent cap of claim 9 wherein the cover portion and the base portion come into contact only along their peripheral edges and at the retaining means.

17. The vent cap of claim 9 wherein the cover portion further comprises a sealing means which combines with the cover portion and the walls of the base portion to provide the vent cap with a substantially sealed enclosure.

18. The vent cap of claim 9 wherein the vent cap comprises a plurality of cavitites which are separated from each other by a rib extending transversely along the tray and between opposing walls of the base portion.

19. The vent cap of claim 9 wherein the apertures of the cover portion are slots having a width of approximately 0.003 inches.

20. The vent cap of claim 19 wherein the slots have a depth of at least 0.040 inches.

21. The vent cap of claim 19 wherein the slots have a depth greater than 0.060 inches.

* * * * *